(No Model.) 2 Sheets—Sheet 1.

E. A. PARSON.
BICYCLE LOCK.

No. 555,878. Patented Mar. 3, 1896.

Witnesses:
Chas. B. Raley.
W. Noffke.

Edward A. Parson
Inventor
by A. Harvey
his Attorney.

ANDREW B. GRAHAM, PHOTO-LITHO, WASHINGTON, D.C.

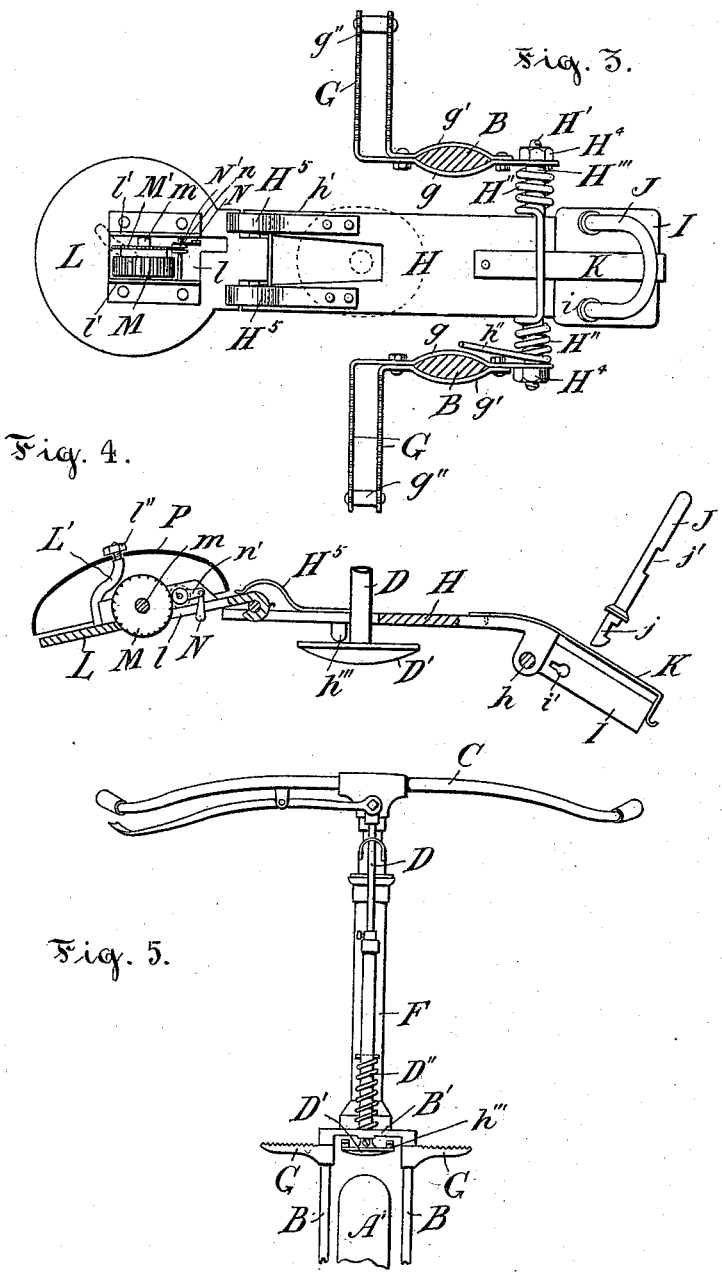

UNITED STATES PATENT OFFICE.

EDWARD A. PARSON, OF OTTAWA, CANADA, ASSIGNOR OF TWO-THIRDS TO CHARLES EDMOND PARSON AND GEORGE WILLIAM PARSON, OF SAME PLACE.

BICYCLE-LOCK.

SPECIFICATION forming part of Letters Patent No. 555,878, dated March 3, 1896.

Application filed April 4, 1895. Serial No. 544,385. (No model.)

*To all whom it may concern:*

Be it known that I, EDWARD A. PARSON, of the city of Ottawa, in the county of Carleton and Province of Ontario, in the Dominion of Canada, have invented certain new and useful Improvements in Bicycle Locks and Alarms; and I do hereby declare that the following is a full, clear, and exact description of the same, reference being had to the accompanying drawings, forming a part hereof.

My invention, which will be hereinafter fully set forth and claimed, relates to bicycles.

The object of my invention is a contrivance for locking the wheel of a bicycle when not in use.

Figure 1:
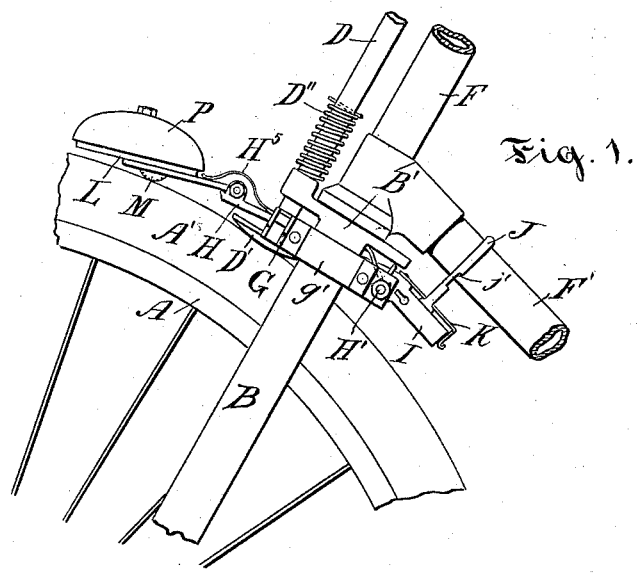
Figure 2:
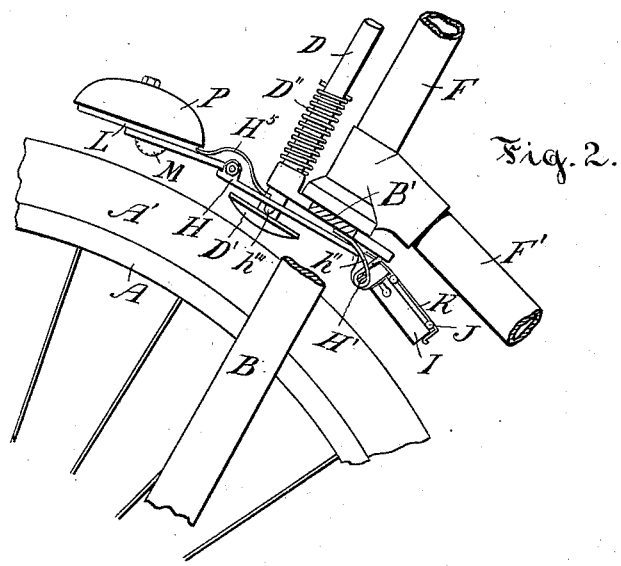

Figure 1 shows part of the head of a bicycle having my improved alarm and lock applied and showing the same locked. Fig. 2 shows the same parts as Fig. 1 unlocked, parts being broken out and the bell out of action. Fig. 3 is a top view of the alarm and lock attachment alone, the brake-rod and fork being dotted in. Fig. 4 is a longitudinal section on line 4 4, Fig. 3, showing the action of the bell and the relation of the plate to the brake; and Fig. 5 is a front elevation parallel to the fork, the bell being omitted.

A is the leading or front wheel, B the fork, B' the head-piece, C the handle-bars and handles, D the brake-rod, with brake D' and brake-spring D'', and E the brake-lever composing the head of a bicycle held in front of the frame F. Upon each tine of the fork B, immediately below the head-piece B', is secured a foot-rest or coaster G. This consists of two plates, one, *g*, on the inner side of the tine, and another, *g'*, outside, the central parts bent to the curvature of the tine, so that the ends come close together and are connected by rivets or bolts to clamp close upon the tine, the front ends being bent out at a right angle, having their upper edges roughened and their ends connected a little distance apart by a bolt, screw, or rivet *g''*. The portion of the plates of the two foot-rests projecting to the front and back of the tines are parallel to each other, the portions projecting rearwardly forming tail ends, each provided with an eye adapted to receive and carry a pin H', passing through both transversely. Said pin forms the pivotal support of a flat plate H, through a bearing *h*, at the rear end of which it passes, so that said plate projects forward between the head of the tines of the fork and straddles the brake-rod just above the brake D', its front end *h'* being forked for that purpose. The ends of the pivot-pin H' are secured by nuts. A spring H'', coiled upon the sleeved projecting ends of the pin H', and passing over the top of the plate and having one or both upwardly-projecting ends *h''* bearing on the under side of the head-piece B', so as to press the forward end of the plate down upon the brake D', projections or buttons *h'''*, being formed on the under side of said plate, bearing upon the top of the brake, or which in the absence of a brake may themselves form a brake. The sleeves H''' upon the projecting ends of the pin H' form at the same time distance-pieces between the edges of the plate or ends of the bearing *h* and the ends of the foot-rest or bearing-plates *g* in which said pin is carried and prevent side motion of the plate, the ends of the pivot being secured on the plates *g* by nuts H⁴.

To the rear end of the plate H is secured or integrally formed therewith parallel to the bottom frame-bar F' a spring-lock I. This may be of any suitable construction adapted to retain the beveled notched and collared ends *j* of a staple J, adapted to pass over said frame-bar and into suitable perforations *i* in the face of said lock. The staple is released by means of an ordinary key passing into a keyhole *i'* at the side of the lock. The relative position of said lock I, bar F', staple J, and plate H is such that when the staple is over the bar F' and the ends *j* in the lock, as shown in Fig. 1, the lock I has been drawn sufficiently up and the front part of the plate H down, so that the latter presses the brake D' hard upon the tire A' of the wheel, thus preventing free rotation of the latter. When not in use, the staple J is carried upon the lock-plate, a spring K, secured upon the plate H and bent down over the end of the lock, being provided for the purpose of holding it in place, notches *j'* being engaged to prevent it from slipping out sidewise.

The forked front end *h'* has hinged to it an extension-plate L carrying a friction-roller M, hammer N, and bell P. The hinge-joint is made with stops limiting its swing in both directions, and is pressed downwardly as far as the stop-shoulder will allow by springs H⁵, which are secured to the plate H. The plate L is provided with a perforation *l*, through which the friction wheel or roller M projects below the lower surface in order to come into contact with the wheel-tire. Said roller, which may be of hard rubber, is secured upon an arbor *m*, journaled transversely upon the upper surface of the plate across the perforation in brackets *l'*, and carries at one side a spur-wheel M'. This latter gears into a pinion *n* upon an arbor N', also journaled in the brackets *l'*. The arbor or pinion carries a crank *n'*, and to this is pivoted the hammer N, which is adapted to strike the bell when the pinion rotates. The bell is secured upon an arm or bracket L' with a shoulder secured by a nut *l''* in the usual way.

The device operates as follows: The spring H'' presses the front of the plate H down on the brake D', and this pressure has to be overbalanced by the brake-spring D'', the plate H and extension L being so set that the roller M is clear of the tire A when the brake-rod is in its normal position. When the brake-rod is pressed down a little by the operation of the brake-lever H, the roller M touches the wheel-tire A' and is rapidly rotated thereby. The motion of the roller M is communicated to and multiplied by the pinion *n* and the hammer N thereon against the bell in rapid succession, thus giving a continuous signal all the time that the brake-rod D is slightly depressed. When the pressure on the brake-lever ceases, the rod D and brake D' are moved up by the spring D'', the brake also lifting the front of the plate H and the extension-plate L, and contact between the wheel-tire and the roller M ceases. If the brake D' is put hard down on the tire, the bell is sounded the same, the necessary play being provided in the joint between the plates H and L regulated by the springs H⁵.

If the wheel is to be locked, the brake is put down hard, the staple J taken from its place under the spring K and put astride over the frame-bar F', and the beveled ends pressed into the perforations in the lock-plate as far as the collars on the shanks will allow, the lock being raised toward the bar, when the notches in the ends are engaged within the lock and securely retained. The brake being down hard on the tire the wheel may of course still be moved, but with difficulty, and if so moved the spokes will not be damaged as is now the case when the ordinary chain-lock is used. Apart from that, when so locked, the head becomes stiffly connected to the frame and steering is impossible, itself sufficient to forbid the use of the machine.

In the absence of a brake this contrivance could still be used as a lock without the alarm, as the buttons *h'''*, preferably somewhat enlarged after the fashion of a brake, would answer as such.

I claim as my invention—

1. The combination with the fork, head-piece and brake of a bicycle, side plates secured to the tines of the fork which may act as foot-rests and to form bearings for a transverse pivot at the rear of the fork, a flat plate pivotally supported in the bearings of said plates and projecting forward and straddling the brake-rod above the brake with the forked end, a spring coiled upon the pivot of said plate and pressing the front of said plate downward, a lock secured to the rear end of said plate and having perforations adapted to receive and hold the ends of a staple, a staple adapted to pass over the lower frame-bar and have its beveled notched and collared ends inserted in the perforations in said lock, substantially as set forth.

2. In a bicycle-lock, the combination of a plate pivotally carried under the head-piece between the tines of the fork on a pivoted support at the rear of the tines in bearings secured to said tines and said plate forked at the front to straddle the brake-rod above the brake, a spring-lock secured to the rear end of said plate and having in its upper face perforations adapted to receive and retain the ends of a staple, a staple having beveled notched and collared ends adapted to pass over the lower frame-bar and have its ends inserted and retained in the perforations in said lock, notches in the shanks of said staple, a spring secured to the upper end of said lock and passing over the rear edge and adapted to engage the notches in said staple and retain the same on the top plate when laid flat thereon and a brake-rod straddled by the front of said plate above the brake upon which said plate is adapted to press, substantially as set forth.

3. In a bicycle-lock, the combination of plates secured to the tines of the fork and forming bearings for a transverse pin or pivot, a flat plate pivotally supported by a transverse pin passing through said bearing-plates and projecting forward and its forward end provided with an enlargement at its lower surface, a spring-lock secured to the rear end of said plate provided with perforations in its upper face adapted to receive and retain the ends of a staple, a staple having beveled notched and collared ends and adapted to pass over the lower frame-bar and have its ends inserted and retained in the perforations in said lock, substantially as set forth.

In testimony whereof I have signed in the presence of the undersigned witnesses.

EDWARD A. PARSON.

Witnesses:
A. HARVEY,
A. TROWSSE.